W. A. LEWIS.
Improvement in Carriage Running-Gear.
No. 129,838. Patented July 23, 1872.
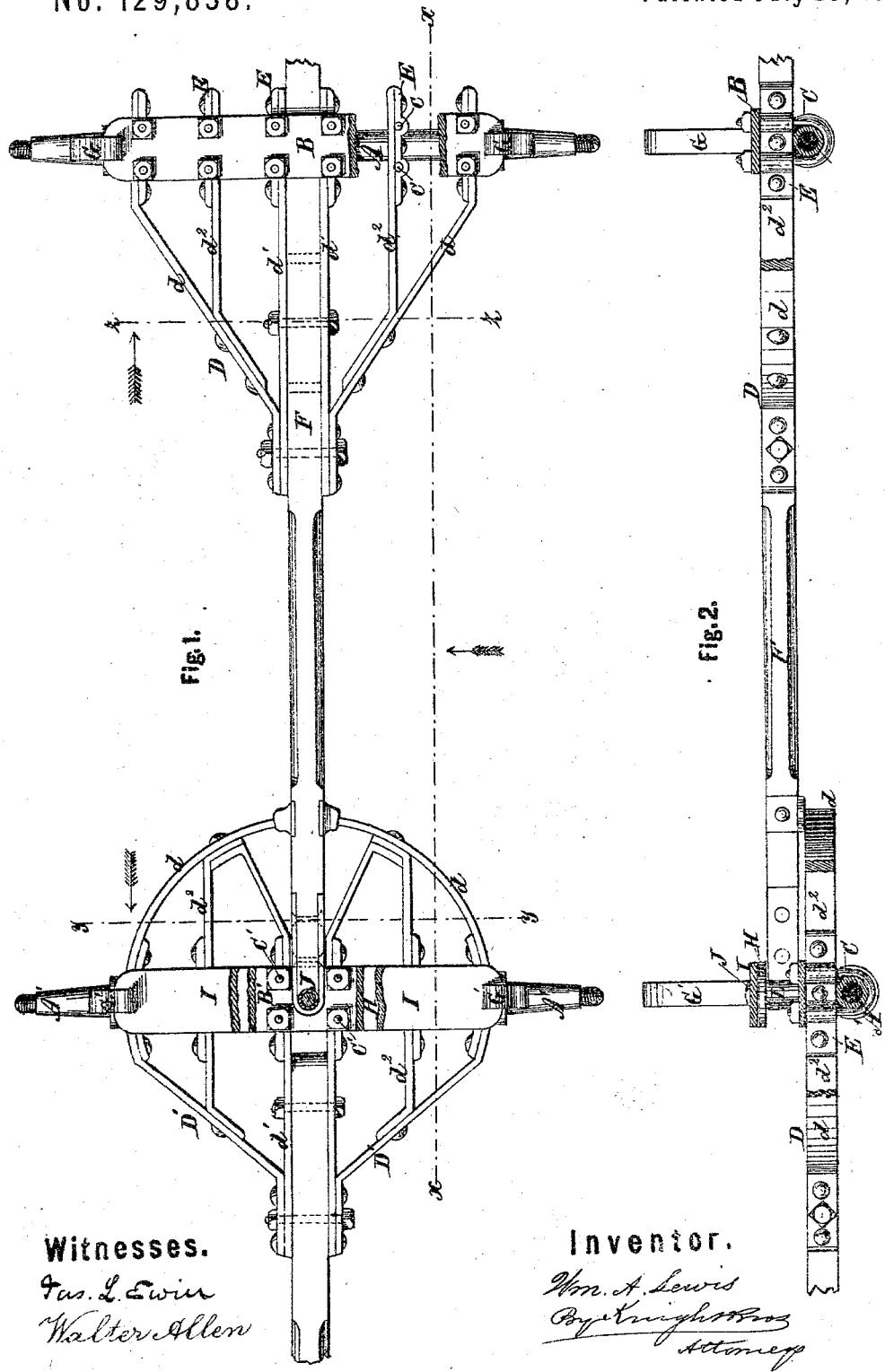
Witnesses.
Jas. L. Ewin
Walter Allen
Inventor.
Wm. A. Lewis
By Knight Bros
Attorneys 2 Sheets--Sheet 2.

W. A. LEWIS.
Improvement in Carriage Running-Gear.

No. 129,838. Patented July 23, 1872.

Witnesses. Inventor.

UNITED STATES PATENT OFFICE.

WILLIAM ARNOLD LEWIS, OF CHICAGO, ILLINOIS.

IMPROVEMENT IN CARRIAGE RUNNING-GEARS.

Specification forming part of Letters Patent No. 129,838, dated July 23, 1872.

Specification of certain Improvements in Running-Gear for Wagons, invented by WILLIAM ARNOLD LEWIS, of Chicago, in the county of Cook and State of Illinois.

Nature and Objects of the Invention.

In carrying out my invention I employ metallic axles of tubular or other suitable form. The other principal parts of the running-gear frame to which my invention relates may be formed of wrought-iron or steel bars, with little or no welding or forging, and hence are constructible almost entirely by machinery. Each axle is braced by a horizontal bar, clipped or bolted to it in such a manner as to act on the principle of a truss-chord. This horizontal bar may be extended sufficiently to serve the purposes of a sand-board, and in the case of the rear axle it constitutes the bolster, the standards or stakes which confine the bed being formed upon its ends. The truss-chord of the forward axle is surmounted by a head-block bolted rigidly thereto at a sufficient distance to admit the end of the reach or perch between them. Upon this head-block the forward bolster rests or turns, the king-bolt passing through said bolster and through both the head-block and the truss-chord. The front and rear hounds are each made up of flat bars set on edge, riveted together, and are placed between the axle and the truss-chord above it. The bars forming the hounds are fastened to the clips which connect the axle and the truss-chord by straps passing around the clips and riveted to the hound-bars. The construction of the forward hounds adapts them to afford the necessary lateral support to the tongue, which is readily attached thereto, and may be supported in horizontal position, if desired.

Description of the Accompanying Drawing.

Figure 3:
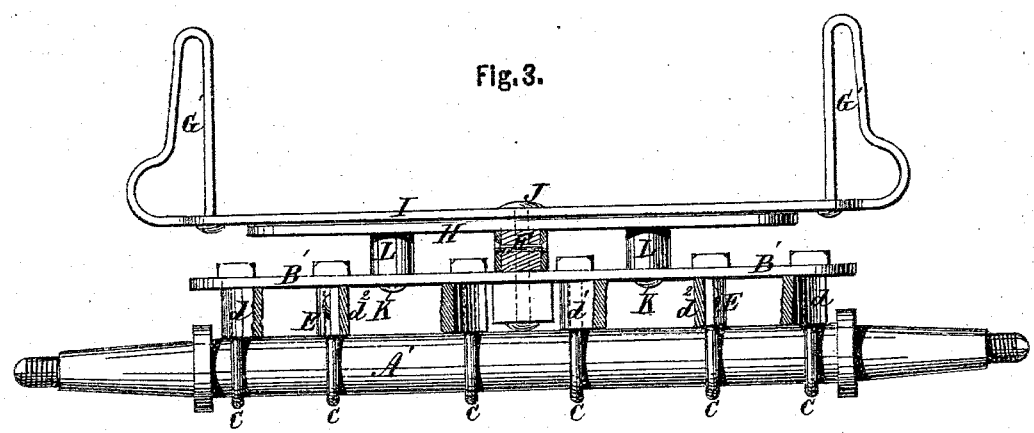
Figure 4:
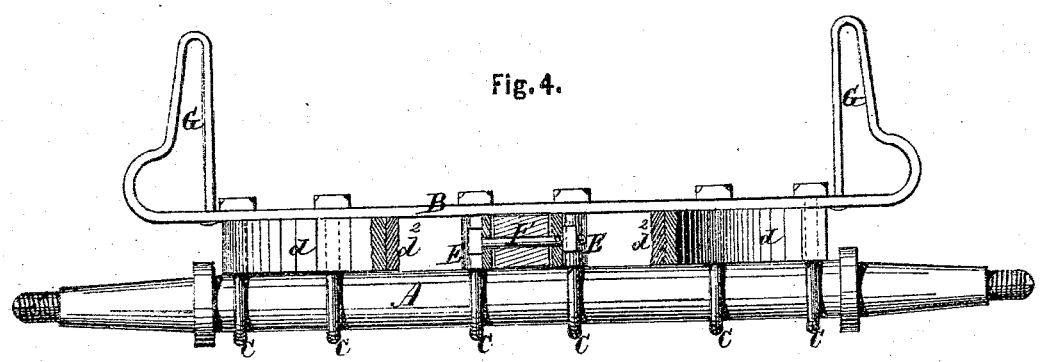

Figure 1 is a plan or top view of a running-gear illustrating my invention, central portions of the forward bolster and of the head-block on which it rests being broken away to expose parts beneath. Fig. 2 is a vertical longitudinal section at $x\,x$, Fig. 1. Fig. 3 is a vertical transverse section at $y\,y$, Fig. 1, showing the front axle in elevation. Fig. 4 is a vertical transverse section at $z\,z$, Fig. 1, showing the rear axle in elevation.

General Description.

A represents the rear axle, and B the truss-chord, which is secured thereto by clips C. The hounds D D are made up of flat bars of wrought-iron or steel set on edge, with their rear ends interposed between the axle A and truss-chord B, as shown. E E are straps securing them to the clips C. The inner bars $d^1$ $d^1$, which cross the axle near its center, are placed parallel to each other, with a sufficient space between them to receive the reach or perch F. The outer bars $d\,d$ converge forward so as to form diagonal braces. Intermediate bars $d^2\,d^2$ are introduced to impart additional strength and rigidity, and the forward ends of all the bars are secured by rivets or bolts. The truss-chord B constitutes the rear bolster. G G represent bolster standards or stakes formed by bending its ends into the form shown in Fig. 4, with vertical inner faces. The prolongations of the bolster to form the standards are made of reduced width. Their extremities may be passed through apertures in the bolster and clinched below. A' is the forward axle, and B' the truss-chord, secured to it by clips C' in the manner already described. The truss-chord projects sufficiently over the axle-collars to serve as a sand-board. Its central portion is surmounted by a head-block, H, formed of a shorter bar. Upon this the forward bolster I rests, the king-bolt J, on which the said bolster turns in customary manner, passing through the head-block H and truss-chord B'. Stakes or standards G' G' are formed on the ends of the bolster I in the manner already described with reference to the rear bolster. Bolts or rivets K secure the truss-chord and head-block together, and sleeves L, surrounding said bolts, keep them at the necessary distance apart to admit the end of the perch F between them. The forward hounds D' D' are made up of bars $d\,d^1\,d^2$, the forward portions of which are constructed and arranged similarly to the corresponding parts in the rear hounds. The rear parts of the front hounds are extended backward to afford greater strength, and also to provide the customary rest or bearing beneath the perch. To this end the side bars $d\,d$ of the front hounds form at back a semicircle, as shown in Fig. 1, being either continuous or else riveted or otherwise fastened together. The center bars $d^1 d^1$ and the intermediate bars $d^2 d^2$ are likewise extended backward, and are secured by rivets or other means to the bow formed by the connected bars $d\ d$.

In wagons that I have made I use for the hounds D bar-iron one and three-fourths by one-fourth inch, and for the rear truss-chord and bolster B, the front truss-chord and sand-board B′, the head-block H, and the forward bolster I, bar-iron four by three-eighths inches, and all trussed, braced, and riveted, as shown.

While describing details which I have used with good effect, I do not desire to limit myself thereto. The truss-chords may be flanged or curved, if desired, and bolted instead of clipped to the axle. It is manifest that the connections between the bars of which the structure is made up may be made by welding instead of riveting, if preferred. The tongue may be secured between the front hounds, and the perch between the rear hounds, in any usual manner. The forward prolongation of the rear hounds and the manner of applying the perch thereto allow unusual lengthening.

Claims.

The following is claimed as new:

1. An axle trussed with a horizontal bar applied and connected thereto substantially as herein set forth.

2. The truss-chord and sand-board B′, constructed and applied as shown, to combine the functions named.

3. The front hounds D′ D′, sand-board B′, and head-block H, constructed and combined as shown.

4. The combination of the axle A′, sand-board B′, and head-block H, trussed together as described.

5. The stakes or standards G or G′ formed upon the ends of the bar B or I, substantially as set forth.

6. The tongue-support constituted of the hounds D′ D′, constructed and braced as set forth.

7. A wagon-hound constituted of an assemblage of bars placed on edge, and arranged and connected as shown.

8. The combination of the rear axle A and bolster and truss-chord B, substantially as and for the purposes set forth.

9. The axle and truss-chord clipped, bolted, or riveted together, in combination with chord-bars fastened to the connections of the axle and truss-chord, substantially as herein described.

10. The reach-support constituted of the rear hounds D D, which are made up of flat bars of metal, the inner bars $d^1 d^1$ being parallel, adapting them to afford continuous support to the reach and to permit unusual lengthening.

To the above specification of my running-gear for wagons I have hereunto set my hand this 29th day of June, 1872.

WM. ARNOLD LEWIS.

Witnesses:
SARAH I. FASSETT,
JAMES R. COMPTON.